May 20, 1924.
E. G. THOMAS
STRIP WEIGHING DEVICE
Filed April 14, 1922
1,494,646
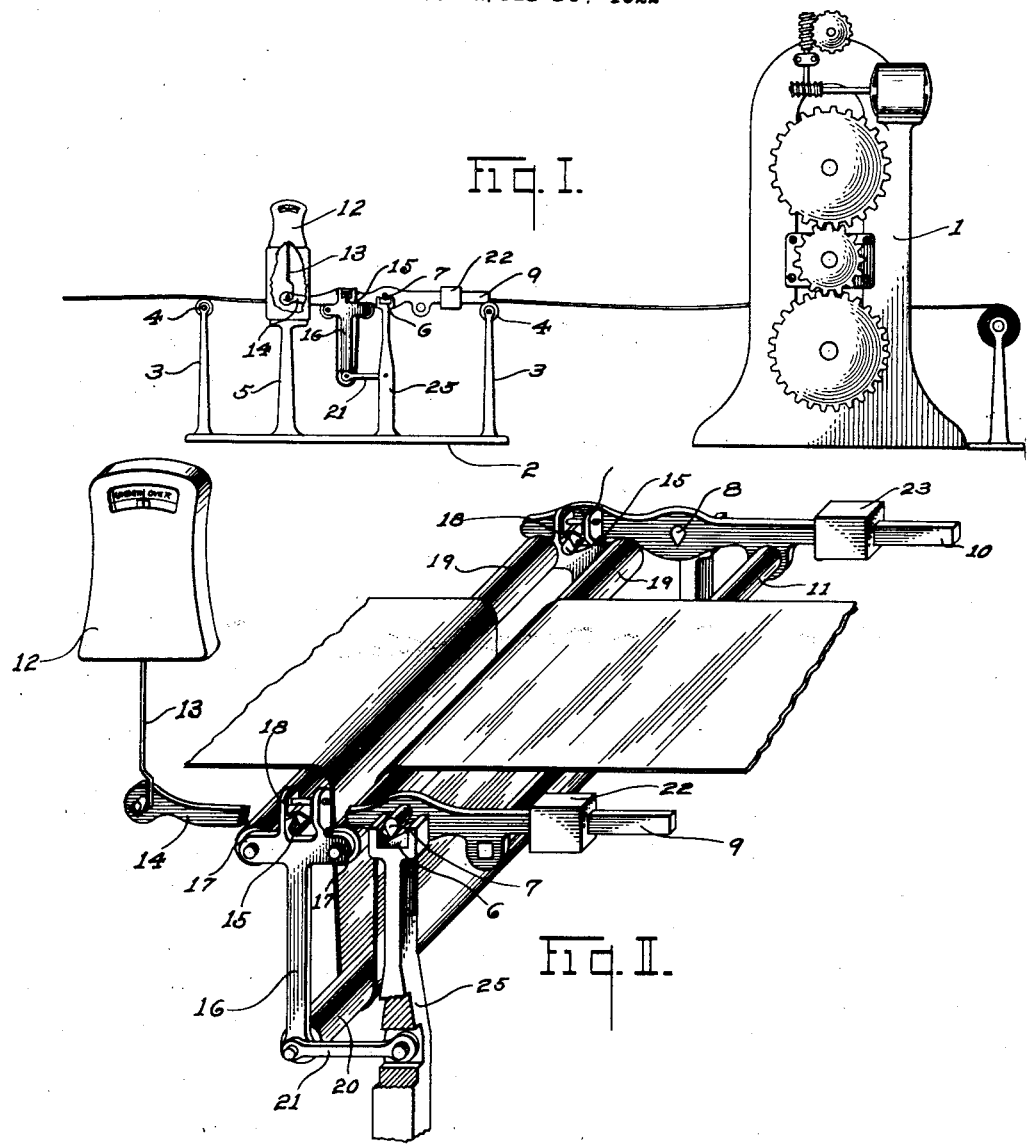
Inventor
EDWARD G. THOMAS.
By CD. Marshall
Attorney Patented May 20, 1924.

1,494,646

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

STRIP-WEIGHING DEVICE.

Application filed April 14, 1922. Serial No. 552,764.

*To all whom it may concern:*

Be it known that I, EDWARD G. THOMAS, a citizen of the United States, residing at Toledo, in the county of Lucas and State of Ohio, have invented certain new and useful Improvements in Strip-Weighing Devices, of which the following is a specification.

This invention relates to devices for testing the weight per unit of length of strips of fabric or other flexible material. It is desirable that coated fabrics and similar products be of uniform weight, and coating machines are commonly provided with devices whereby the weight or thickness of the coating may be increased or decreased. It is very difficult, however, to detect small variations in the weight of the coating until a considerable length of the material has been coated and the coating is set sufficiently so that the length of the material can be handled and weighed, and failure to immediately detect variations in the thickness or weight of the coating often results in considerable losses. In order that small variations in the weight of the strip per unit of length may be readily detected, it is desirable that a considerable length of the material be weighed or tested, and a device arranged for testing considerable lengths of material while the strip is extended horizontally takes up much valuable space.

One of the principal objects of my invention is to provide a device which is capable of testing considerable lengths of moving strips of material while such material is arranged to occupy comparatively little space.

Another object of the invention is to provide a strip-receiving element for a testing device, upon which element the strip to be tested is arranged in one or more folds so that the amount of space occupied by the length of fabric being tested is comparatively small.

Still another object is the provision of a testing device having a strip-receiving element of the character specified in the preceding paragraph, the parts of the testing device being so designed that the accuracy of the testing device is not materially affected by changes in the state of tautness of the material being tested.

Other objects and advantages will be apparent from the following description, in which reference is had to the accompanying drawings illustrating a preferred embodiment of my invention and wherein similar reference numerals designate similar parts throughout the several views.

In the drawings:—

Figure I is an elevational view showing a testing device embodying my invention arranged in juxtaposition to a calendering machine, a part of the housing of the testing device being broken away; and Figure II is an enlarged fragmentary perspective view, with parts broken away, showing a part of the testing device to which my invention particularly relates.

Referring to the drawings in detail, the calendering machine 1 illustrated in Figure I is shown merely to better illustrate the purpose of the machine. and forms no part of the present invention. The frame of the testing device consists of a base 2 upon which are fixedly supported uprights 3, fulcrum standards 25 and a pedestal 5. Journaled in the upper ends of the uprights 3 is a pair of rollers 4 which are tangent to the same plane, the device being preferably so arranged that the plane to which the rollers 4 are tangent is horizontal. Supported in bearings 6 at the upper ends of the fulcrum standards 25 are fulcrum pivots 7 and 8 which are respectively fixed to levers 9 and 10, the levers 9 and 10 being fixedly connected by means of a transversely-extending bar 11, the levers 9 and 10 and the bar 11 thus forming a pivoted frame.

Supported upon the pedestal 5 is an automatic predetermined weighing and indicating device 12, the weighing and indicating mechanism of which is connected by means of a link 13 to the extended end 14 of the lever 9. The predetermined weighing and indicating mechanism 12 may be of any desired type, and I have not, therefore, shown it in detail. The levers 9 and 10 are provided with load pivots 15 upon which is supported the fabric-receiving frame of the testing device. The fabric-receiving frame comprises a pair of substantially T-shaped end members 16, from the tops of each of which project ears 17 to which are pivoted self-aligning bearings 18 which engage the load pivots 15.

Journaled at the opposite ends of the upper or horizontally-extending parts of the end members 16 are two parallel rollers 19, and journaled at the lower ends of the vertically-extending parts of the T-shaped members 16 is a third roller 20, which is also parallel to the rollers 19. The vertically and horizontally-extending parts of the T-shaped members 16 are held in vertical and horizontal positions respectively during movements of the levers 9 and 10 by means of a check link 21, one end of which is pivoted to the lower end of the members 16, its other end being pivoted to one of the fulcrum standards 25.

Slidably mounted upon the levers 9 and 10 are poises 22 and 23 of sufficient weight to counterbalance the frame formed by the members 16 and the rollers 19 and 20, as well as the weight of the length of fabric which is supported by the frame.

In arranging the machine for operation, the strip of fabric is laid over one of the rollers 4 and one of the rollers 19 and thence downwardly around the roller 20 and up over the other roller 19 and the other roller 4. The poises 22 and 23 are so set that when the fabric is of the desired weight per unit of length the indicator of the predetermined weighing and indicating device 12 stands at the predetermined mark, in the position shown in the drawings. The machine is so adjusted that when the indicator of the predetermined weighing and indicating device stands at the predetermined mark the rollers 19 and the rollers 4 are all tangent to the same plane. With the machine so adjusted the state of tautness of the strip of material does not affect the indicating mechanism because such pull of the fabric on the rollers 19 as is due to its tautness does not tend to move the rollers 19 either upwardly or downwardly. One-half of the portion of the strip of fabric which extends between the rollers 19 and the rollers 4, as well as the connecting portion of the strip of fabric which extends from the rollers 19 downwardly around the roller 20, is supported by the levers 9 and 10. By the use of a strip-receiving frame having one or more rollers 20, the length of fabric supported by the levers 9 and 10 may be increased to almost any desired extent without materially increasing the space occupied by the strip testing device. Since the effect of a given variation in weight per unit of length is proportional to the length of the portion of the strip supported by the levers, the sensitiveness of the device to variations in the weight of the fabric is increased accordingly.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a device of the class described, in combination, a pair of supports for a strip of material, and means engaging the material between said supports for detecting changes in the weight per unit of length, said means including devices for forming a fold of said material and a support for the fold of said material, the parts being so constructed and arranged that said detecting means is substantially unaffected by changes in the tautness of the strip of material.

2. In a device of the class described, in combination, a pair of supports for a strip of material, and a predetermined weight weighing device adapted to be adjusted to weigh a portion of the strip of material being tested, said predetermined weight weighing device including a strip-receiving frame having means engaging said strip, said means normally lying in the same plane as said supports, and means positioned intermediate said strip-engaging means for forming and supporting a folded portion of said material of predetermined length.

3. In a device of the class described, in combination, a pair of supports for a strip of material, a predetermined weight weighing device adapted to support a portion of said strip of material between said pair of supports, said predetermined weight weighing device including a strip-receiving frame having a pair of supports lying in the same plane with the first-mentioned supports when said device is in predetermined weighing position, and means forming intermediate the second-mentioned supports a loop of said material of definite length.

4. In a predetermined weight weighing device for strips of fabric, in combination, lever mechanism, and a strip-receiving frame pivotally supported thereon, said strip-receiving frame comprising a pair of rollers tangent to the same horizontal plane, and additional roller means lying out of said horizontal plane and located between said first-mentioned rollers and adapted to engage a looped portion of said material.

5. In a predetermined weight weighing device for strips of fabric, in combination, lever mechanism, a strip-receiving frame pivotally supported thereon, said strip-receiving frame comprising a pair of rollers tangent to the same horizontal plane, and additional roller means lying out of said horizontal plane and located between said first-mentioned rollers and adapted to engage a looped portion of said material, manually-adjustable means for counterbalancing the major portion of the load carried by said strip receiving frame, and automatic weighing and indicating means for detecting variations from a predetermined weight of the portion of the strip supported by said frame.

6. In a predetermined weight weighing device for strips of fabric, in combination, a pair of supports lying in the same horizontal plane, lever mechanism, and a strip-receiving frame pivotally supported thereon, said strip-receiving frame comprising a pair of rollers, said rollers being tangent to the horizontal plane in which said supports lie when said device is in predetermined weighing position, and additional roller means lying out of said horizontal plane and located between said first-mentioned rollers and adapted to engage a looped portion of said material.

7. In a predetermined weight weighing device for strips of fabric, in combination, a pair of supports lying in the same horizontal plane, lever mechanism, a strip-receiving frame pivotally supported thereon, said strip-receiving frame comprising a pair of rollers, said rollers being tangent to the horizontal plane in which said supports lie when said device is in predetermined weighing position, and additional roller means lying out of said horizontal plane and located between said first-mentioned rollers and adapted to engage a looped portion of said material, manually-adjustable means for counterbalancing the major portion of the load carried by said strip-receiving frame, and automatic weighing and indicating means for detecting variations from a predetermined weight of the portion of the strip supported by said frame.

8. In a predetermined weight weighing device for strips of fabric, in combination, a pair of rollers tangent to the same horizontal plane, and a strip-receiving frame pivotally supported thereon, said strip-receiving frame comprising a pair of rollers, said rollers being tangent to the same plane to which the first-mentioned rollers are tangent when said device is in predetermined weighing position, and additional roller means lying out of said horizontal plane and located between said first-mentioned rollers and adapted to engage a looped portion of said material.

9. In a predetermined weight weighing device for strips of fabric, in combination, a pair of rollers tangent to the same plane, a movable strip-receiving frame positioned between said rollers, said frame including a series of rollers adapted to form a strip of material into loop formation, the end rollers of said series being tangent to the horizontal plane to which the first-mentioned rollers are tangent when the device is in predetermined weighing position.

EDWARD G. THOMAS.

Witnesses:
FRANCES DOYLE,
H. O. ERNSBERGER.